(12) United States Patent
Chiu et al.

(10) Patent No.: US 10,244,248 B2
(45) Date of Patent: Mar. 26, 2019

(54) RESIDUAL PROCESSING CIRCUIT USING SINGLE-PATH PIPELINE OR MULTI-PATH PIPELINE AND ASSOCIATED RESIDUAL PROCESSING METHOD

(71) Applicant: MEDIATEK INC., Hsin-Chu (TW)

(72) Inventors: Min-Hao Chiu, Hsinchu (TW); Chia-Yun Cheng, Hsinchu County (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 201 days.

(21) Appl. No.: 15/438,774

(22) Filed: Feb. 22, 2017

(65) Prior Publication Data

US 2017/0251218 A1 Aug. 31, 2017

Related U.S. Application Data

(60) Provisional application No. 62/299,577, filed on Feb. 25, 2016.

(51) Int. Cl.
  *H04N 19/44* (2014.01)
  *H04N 19/436* (2014.01)
  *H04N 19/61* (2014.01)

(52) U.S. Cl.
  CPC ........... *H04N 19/436* (2014.11); *H04N 19/61* (2014.11)

(58) Field of Classification Search
  CPC .............................. H04N 19/436; H04N 19/61
  See application file for complete search history.

(56) References Cited

U.S. PATENT DOCUMENTS 8,923,406 B2  12/2014  Mrak

FOREIGN PATENT DOCUMENTS

| CN | 103796015 A | 5/2014 |
| TW | 201204049 A1 | 1/2012 |
| TW | 201404166 A | 1/2014 |

OTHER PUBLICATIONS

Yi-Chih Chao; Shih-Tse Wei; Bin-Da Liu; Jar-Ferr Yang, "Combined CAVLC Decoder, Inverse Quantizer, and Transform Kernel in Compact H.264/AVC Decoder", IEEE Transactions on Circuits and Systems for Video Technology, Jan. 2009, vol. 19,No. 1, pp. 53-62, 2009 IEEE.

*Primary Examiner* — Jonathan R Messmore
(74) *Attorney, Agent, or Firm* — Winston Hsu

(57) ABSTRACT

A residual processing circuit has a single-path pipeline and a single-path controller. The single-path pipeline has an inverse scan (IS) circuit, an inverse quantization (IQ) circuit and an inverse transform (IT) circuit arranged to process a current non-zero residual data block in a pipeline manner. The current non-zero residual data block is at least a portion of a transform unit. The single-path controller controls pipelined processing of the current non-zero residual data block at the single-path pipeline. The single-path controller instructs the IS circuit to start IS processing of a next non-zero residual data block before the IT circuit finishes a first half of IT processing of the current non-zero residual data block.

17 Claims, 12 Drawing Sheets

RESIDUAL PROCESSING CIRCUIT USING SINGLE-PATH PIPELINE OR MULTI-PATH PIPELINE AND ASSOCIATED RESIDUAL PROCESSING METHOD

CROSS REFERENCE TO RELATED APPLICATIONS

This application claims the benefit of U.S. provisional application No. 62/299,577, filed on Feb. 25, 2016 and incorporated herein by reference.

BACKGROUND

The present invention relates to a video decoder design, and more particularly, to a residual processing circuit using a single-path pipeline or a multi-path pipeline and an associated residual processing method.

The conventional video coding standards generally adopt a block based coding technique to exploit spatial and temporal redundancy. For example, the basic approach is to divide the whole source frame into a plurality of blocks, perform intra prediction/inter prediction on each block, transform residues of each block, and perform quantization and entropy encoding. Besides, a reconstructed frame is generated in a coding loop to provide reference pixel data used for coding following blocks. For certain video coding standards, in-loop filter(s) may be used for enhancing the image quality of the reconstructed frame.

A video decoder is used to perform an inverse operation of a video encoding operation performed by a video encoder. For example, regarding processing of residual data, transform, quantization, scan and entropy encoding are performed at the video encoder, while entropy decoding, inverse scan, inverse quantization, and inverse transform are performed at the video decoder. To improve the residual processing performance of the video decoder, pipeline architecture may be employed. Thus, there is a need for high performance pipeline architecture for dealing with inverse scan, inverse quantization, and inverse transform efficiently.

SUMMARY

One of the objectives of the claimed invention is to provide a residual processing circuit using a single-path pipeline or a multi-path pipeline and an associated residual processing method.

According to a first aspect of the present invention, an exemplary residual processing circuit is disclosed. The exemplary residual processing circuit includes a single-path pipeline and a single-path controller. The single-path pipeline includes an inverse scan (IS) circuit, an inverse quantization (IQ) circuit and an inverse transform (IT) circuit arranged to process a current non-zero residual data block in a pipeline manner, wherein the current non-zero residual data block is at least a portion of a transform unit. The single-path controller is arranged to control pipelined processing of the current non-zero residual data block at the single-path pipeline, wherein the single-path controller instructs the IS circuit to start IS processing of a next non-zero residual data block before the IT circuit finishes a first half of IT processing of the current non-zero residual data block.

According to a second aspect of the present invention, an exemplary residual processing circuit is disclosed. The exemplary residual processing circuit includes a multi-path pipeline and a multi-path controller. The multi-path pipeline includes a plurality of parallel single-path pipelines, each having an inverse scan (IS) circuit, an inverse quantization (IQ) circuit and an inverse transform (IT) circuit arranged to process a non-zero residual data block in a pipeline manner, wherein the non-zero residual data block is at least a portion of a transform unit, and the parallel single-path pipelines have a first single-path pipeline and a second single-path pipeline. The multi-path controller is arranged to control pipelined processing of a plurality of non-zero residual data blocks, wherein the multi-path controller instructs the second single-path pipeline to start pipelined processing of a next non-zero residual data block before the first single-path pipeline finishes a first half of IT processing of a current non-zero residual data block.

According to a third aspect of the present invention, an exemplary residual processing method is disclosed. The exemplary residual processing method includes: utilizing a single-path pipeline to process a current non-zero residual data block in a pipeline manner, wherein the single-path pipeline comprises an inverse scan (IS) circuit, an inverse quantization (IQ) circuit and an inverse transform (IT) circuit, and the current non-zero residual data block is at least a portion of a transform unit; and controlling pipelined processing of the current non-zero residual data block at the single-path pipeline, wherein the IS circuit is instructed to start IS processing of a next non-zero residual data block before the IT circuit finishes a first half of IT processing of the current non-zero residual data block.

According to a fourth aspect of the present invention, an exemplary residual processing method is disclosed. The exemplary residual processing method includes: utilizing a multi-path pipeline to process a plurality of non-zero residual data blocks, wherein the multi-path pipeline comprises a plurality of parallel single-path pipelines, each comprising an inverse scan (IS) circuit, an inverse quantization (IQ) circuit and an inverse transform (IT) circuit arranged to process a non-zero residual data block in a pipeline manner, the non-zero residual data block is at least a portion of a transform unit, and the parallel single-path pipelines comprise a first single-path pipeline and a second single-path pipeline; and controlling pipelined processing of the non-zero residual data blocks, wherein the second single-path pipeline is instructed to start pipelined processing of a next non-zero residual data block before the first single-path pipeline finishes a first half of IT processing of a current non-zero residual data block.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
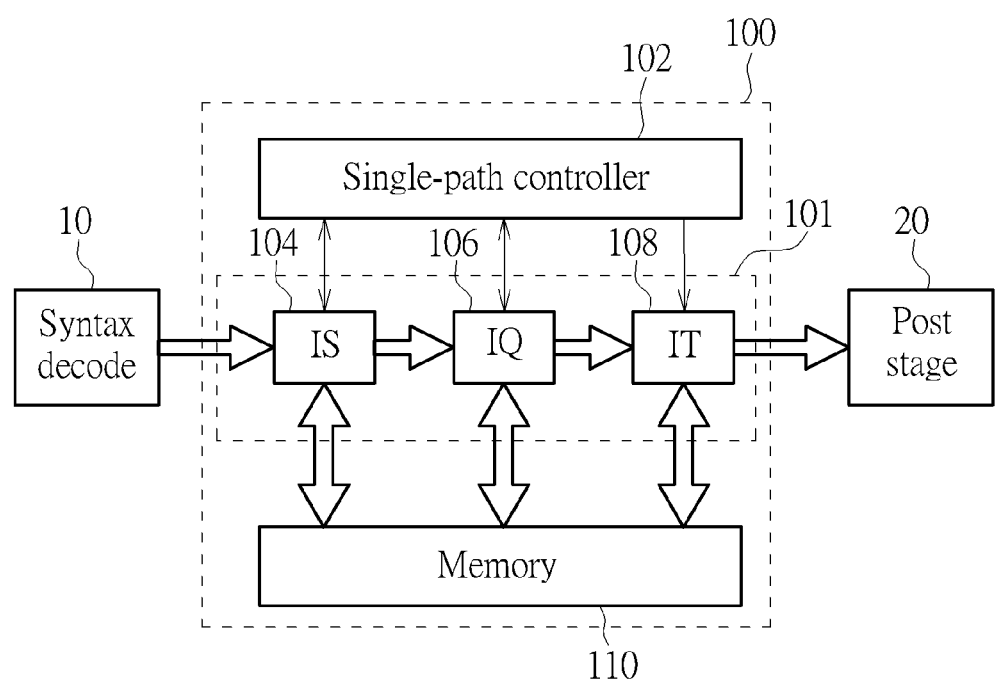
FIG. 1 is a block diagram illustrating a single-path pipeline based residual processing circuit according to an embodiment of the present invention.

FIG. 1 is a block diagram illustrating a single-path pipeline based residual processing circuit according to an embodiment of the present invention. By way of example, but not limitation, the single-path pipeline based residual processing circuit 100 may be a part of a video decoder, such as an HEVC (high efficiency video coding) decoder or an AVS2 ($2^{nd}$ generation audio video coding standard) decoder. The single-path pipeline based residual processing circuit 100 includes a single-path pipeline 101, a single-path controller 102 and a storage device (e.g., a memory 110). For example, the memory 110 may be an on-chip static random access memory (SRAM). In this embodiment, the single-path pipeline 101 includes an inverse scan circuit (denoted by "IS") 104, an inverse quantization circuit (denoted by "IQ") 106, and an inverse transform circuit (denoted by "IT") 108. In this embodiment, the IS circuit 104 may act as a single pipeline stage for accomplishing the whole IS process of one non-zero residual data block, the IQ circuit 106 may act as a single pipeline stage for accomplishing the whole IQ process of one non-zero residual data block, and the IT circuit 108 may have first pipeline stage(s) and second pipeline stage(s) for accomplishing the whole IT process of one non-zero residual data block, where the first pipeline stage(s) are responsible for performing a first one-dimensional (1D) inverse transform, and the second pipeline stage(s) are responsible for performing a second one-dimensional (1D) inverse transform. For example, supposing that the first 1D inverse transform and the second 1D inverse transform are performed in order, a first half of the IT process is the first 1D inverse transform that is performed by first pipeline stage(s), and a second half of the IT process is the second 1D inverse transform that is performed by second pipeline stage(s).

The single-path pipeline based residual processing circuit 100 is coupled between a syntax decoder (denoted by "Syntax decode") 10 and a post stage 20. For example, the syntax decoder 10 may be an entropy decoder, and the post stage 20 may be a reconstruction circuit. The entropy-decoded residual data is generated from the syntax decoder 10 to the single-path pipeline based residual processing circuit 100 (particularly, the single-path pipeline 101), and pipeline-processed residual data is output from the single-path pipeline based residual processing circuit 100 (particularly, the single-path pipeline 101) to the post stage 20 for further processing. Since the present invention focuses on the single-path pipeline and associated pipeline control, further description of a preceding processing circuit (e.g., syntax decoder 10) and a following processing circuit (e.g., post stage 20) of the single-path pipeline based residual processing circuit 100 is omitted here for brevity.

The IS circuit 104, IQ circuit 106 and IT circuit 108 are arranged to process the same non-zero residual data block in a pipeline manner. In one exemplary implementation, transform units (TUs) are successively fed into the single-path pipeline 101. Hence, a non-zero residual data block to be sequentially processed by IS circuit 104, IQ circuit 106 and IT circuit 108 is one TU. In another exemplary implementation, partial TUs are successively fed into the single-path pipeline 101. For example, a left part and a right part of the same TU may be successively fed into the single-path pipeline 101. Hence, a non-zero residual data block to be sequentially processed by IS circuit 104, IQ circuit 106 and IT circuit 108 is merely a portion of one TU. For clarity and simplicity, the following assumes that the single-path pipeline 101 is used to process non-zero residual data blocks each being one TU. However, this is for illustrative purposes only, and is not meant to be a limitation of the present invention.

The memory 110 is arranged to provide a working buffer for each of IS circuit 104, IQ circuit 106 and IT circuit 108. The single-path controller 102 is arranged to control pipelined processing of each non-zero residual data block (e.g., one TU) at the single-path pipeline 101. For example, concerning pipelined processing of each non-zero residual data block, the single-path controller 102 controls the start time of the IS circuit 104, the start time of the IQ circuit, and the start time of the IT circuit 108. In this embodiment, by using a proposed pipeline control scheme, the single-path controller 102 instructs the IS circuit 104 to start IS processing of a next non-zero residual data block before the IT circuit finishes a first half (e.g., a first 1D inverse transform) of IT processing of a current non-zero residual data block. In this way, the bubble (i.e., idle cycles) associated with each of IS circuit 104, IQ circuit 106 and IT circuit 108 in the single-path pipeline 101 can be avoided or reduced to thereby achieve high performance.

Figure 2:
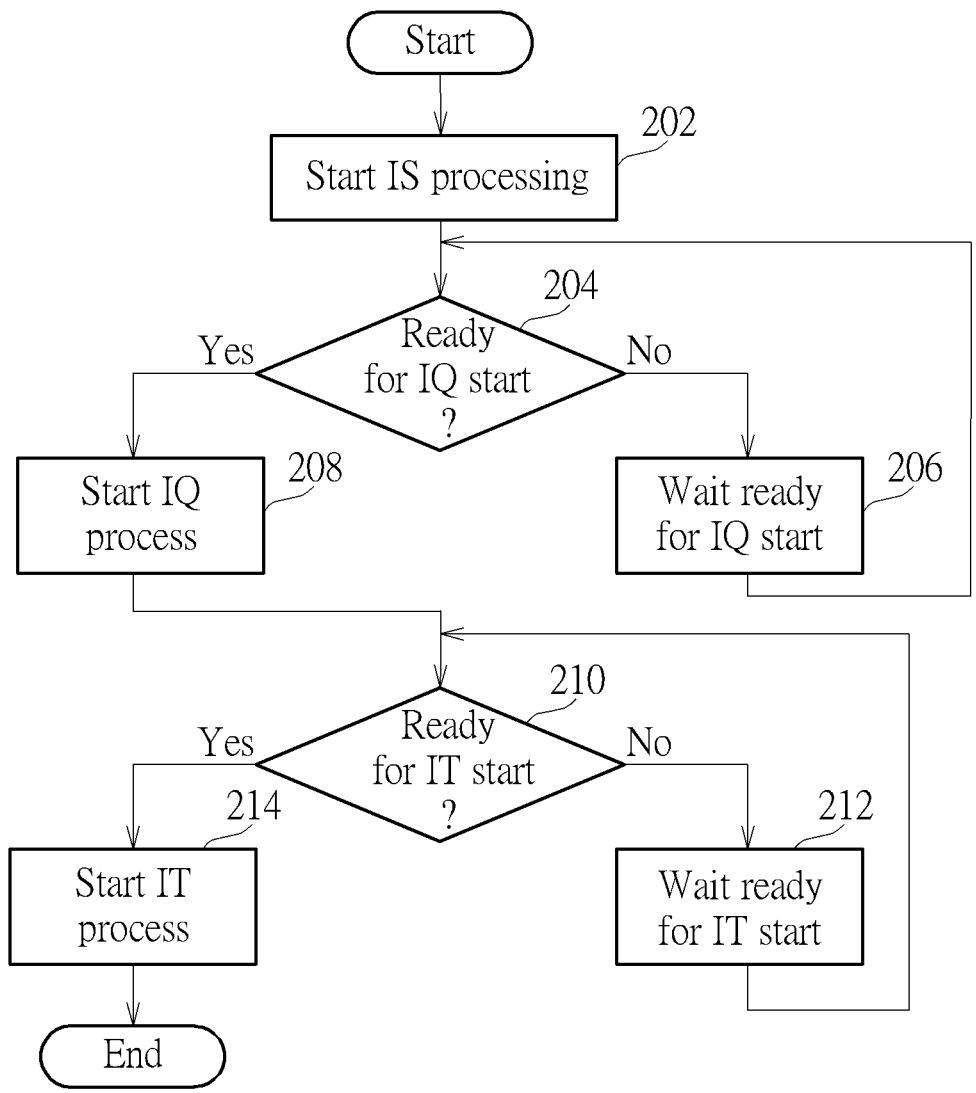
FIG. 2 is a flowchart illustrating a single-path pipeline based decoding method according to an embodiment of the present invention.

FIG. 2 is a flowchart illustrating a single-path pipeline based decoding method according to an embodiment of the present invention. The method may be performed by the single-path pipeline based residual processing circuit 100. Provided that the result is substantially the same, the steps are not required to be executed in the exact order shown in FIG. 2. Initially, the IS circuit 104 (which is the leading pipeline stage of the single-path pipeline 101) is allowed to start IS processing of a current non-zero residual data block (e.g., the first TU of a picture to be decoded) due to the fact that the IS circuit 104 is idle and ready of IS process start can be confirmed. At step 202, the single-path controller 102 instructs the IS circuit 104 to start IS processing of a current non-zero residual data block. At step 204, the single-path controller 102 checks if the IQ circuit 106 is ready to start IQ processing of the current non-zero residual data block. If the IQ circuit 106 is not ready to start IQ processing of the current non-zero residual data block, the single-path controller 102 waits for ready of the IQ process start (Step 206), and keeps checking if the IQ circuit 106 is ready to start IQ processing of the current non-zero residual data block (Step 204). However, if ready of the IQ process start is confirmed, the flow proceeds with step 208. At step 208, the single-path controller 102 instructs the IQ circuit 106 to start IQ processing of the current non-zero residual data block (particularly, IQ processing of IS processed data of the current non-zero residual data block).

At step 210, the single-path controller 102 checks if the IT circuit 108 is ready to start IT processing of the current non-zero residual data block. If the IT circuit 108 is not ready to start IT processing of the current non-zero residual data block, the single-path controller 102 waits for ready of the IT process start (Step 212), and keeps checking if the IT circuit 108 is ready to start IT processing of the current non-zero residual data block (Step 210). However, if ready of the IT process start is confirmed, the flow proceeds with step 214. At step 214, the single-path controller 102 instructs the IT circuit 106 to start IT processing of the current non-zero residual data block (particularly, IT processing of IQ processed data of the current non-zero residual data block).

The same decoding flow shown in FIG. 2 may be employed to process each non-zero residual data block (e.g., each TU). It should be noted that the IS circuit 104 is allowed to start IS processing of a residual data block when the IS circuit 104 is ready/available to process the residual data block. In addition, the IQ circuit 106 is allowed to start IQ processing of a residual data block when the IQ circuit 106 is ready/available to process the residual data block; and the IT circuit 108 is allowed to start IT processing of a residual data block when the IT circuit 108 is ready/available to process the residual data block. Since the IS process, IQ process and IT process are sequentially activated for processing a current non-zero residual data block, it is possible that the IS circuit 104 is ready to process a next non-zero residual data block before the IT circuit 108 finishes the first half (e.g., the first 1D inverse transform) of IT processing of the current non-zero residual data block. Since the IS circuit 104 is ready to process a next non-zero residual data block, the single-path controller 102 instructs the IS circuit 104 to start the IS processing of the next non-zero residual data block. Since the IS process start of the next non-zero residual data block does not need to wait for the finish of the first half (e.g., the first 1D inverse transform) of IT processing of the current non-zero residual data block, the bubble (i.e., idle cycles) of the IS circuit 104 can be avoided/reduced. Moreover, since the IS process, IQ process and IT process are sequentially activated for processing the next non-zero residual data block when ready of the IS process start, ready of the IQ process start and ready of the IT process start are sequentially confirmed, the bubble (i.e., idle cycles) of the IQ circuit 106 can be avoided/reduced, and the bubble (i.e., idle cycles) of the IT circuit 108 can also be avoided/reduced.

Figure 3:
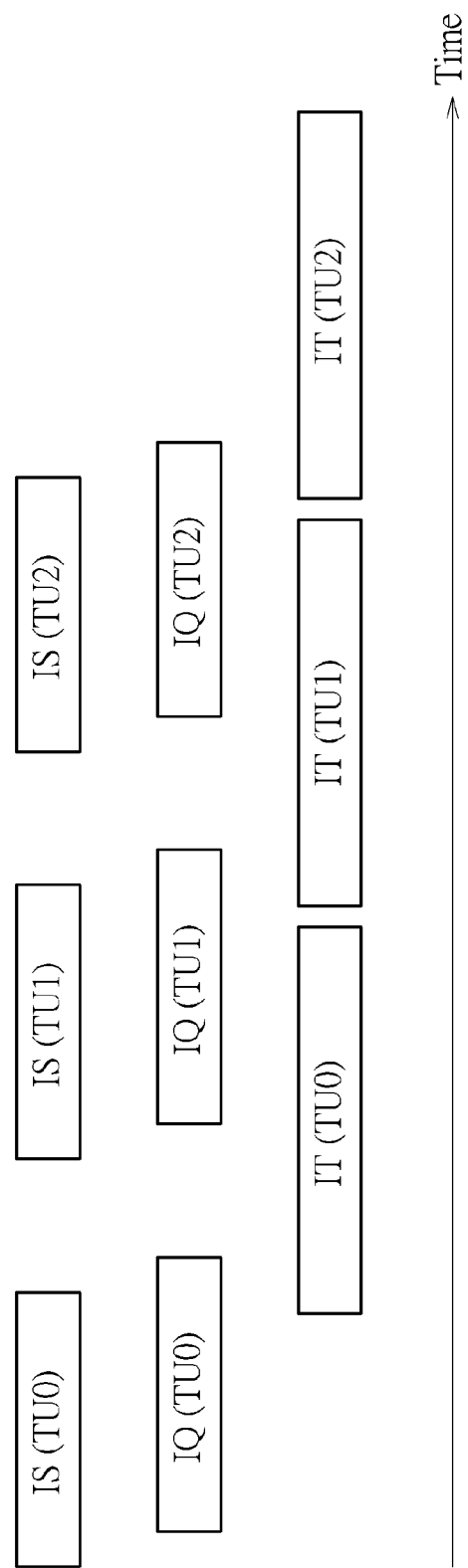
FIG. 3 is a diagram illustrating a single-path pipeline based decoding operation according to an embodiment of the present invention.

FIG. 3 is a diagram illustrating a single-path pipeline based decoding operation according to an embodiment of the present invention. In this embodiment, transform units sequentially fed into the single-path pipeline 101 include a first transform unit TU0, a second transform unit TU1 and a third transform unit TU2. As shown in FIG. 3, the single-path controller 102 instructs the IS circuit 104 to start IS processing of the first transform unit TU0 when ready of the associated IS process start is confirmed, instructs the IS circuit 104 to start IS processing of the second transform unit TU1 when ready of the associated IS process start is confirmed, and instructs the IS circuit 104 to start IS processing of the third transform unit TU2 when ready of the associated IS process start is confirmed. Similarly, the single-path controller 102 instructs the IQ circuit 106 to start IQ processing of the first transform unit TU0 when ready of the associated IQ process start is confirmed, instructs the IQ circuit 106 to start IQ processing of the second transform unit TU1 when ready of the associated IQ process start is confirmed, and instructs the IQ circuit 106 to start IQ processing of the third transform unit TU2 when ready of the associated IQ process start is confirmed. In addition, the single-path controller 102 instructs the IT circuit 108 to start IT processing of the first transform unit TU0 when ready of the associated IT process start is confirmed, instructs the IT circuit 108 to start IT processing of the second transform unit TU1 when ready of the associated IT process start is confirmed, and instructs the IT circuit 108 to start IT processing of the third transform unit TU2 when ready of the associated IT process start is confirmed. As shown in FIG. 3, the IS circuit 104 starts IS processing of the second transform unit TU1 before the IT circuit 108 finishes the first half (e.g., the first 1D inverse transform) of IT processing of the first transform unit TU0, and the IS circuit 104 starts IS processing of the third transform unit TU2 before the IT circuit 108 finishes the first half (e.g., the first 1D inverse transform) of IT processing of the second transform unit TU1. In this way, high performance pipeline architecture is achieved under the proposed pipeline control applied to the single-path pipeline 101.

In one exemplary design, the single-path controller 102 confirms ready of IS process start, ready of IQ process start and ready of IT process start by monitoring processing progresses of IS circuit 104, IQ circuit 106 and IT circuit 108 in a realtime manner. Hence, the single-path controller 102 adaptively controls the pipelined processing of the current non-zero residual data block according to the monitored processing progresses.

In another exemplary design, the single-path controller 102 confirms ready of IS process start, ready of IQ process start and ready of IT process start by using a smart datapath throughput prediction (SDTP) scheme. For example, the single-path controller 102 predicts a start time of the IS circuit 104 for applying IS processing to a current non-zero residual data block, a start time of the IQ circuit 106 for applying IQ processing to the current non-zero residual data block, and a start time of the IT circuit 108 for applying IT processing to the current non-zero residual data block, and controls the actual pipelined processing of the current non-zero residual data block according to the predicted start time of the IS circuit 104, the predicted start time of the IQ circuit 106 and the predicted start time of the IT circuit 108. Compared to the realtime monitoring of processing progresses of IS circuit 104, IQ circuit 106 and IT circuit 108, the proposed SDTP scheme is a low-cost solution for pipeline control. Further details of the proposed SDTP scheme are described as below.

Figure 4:
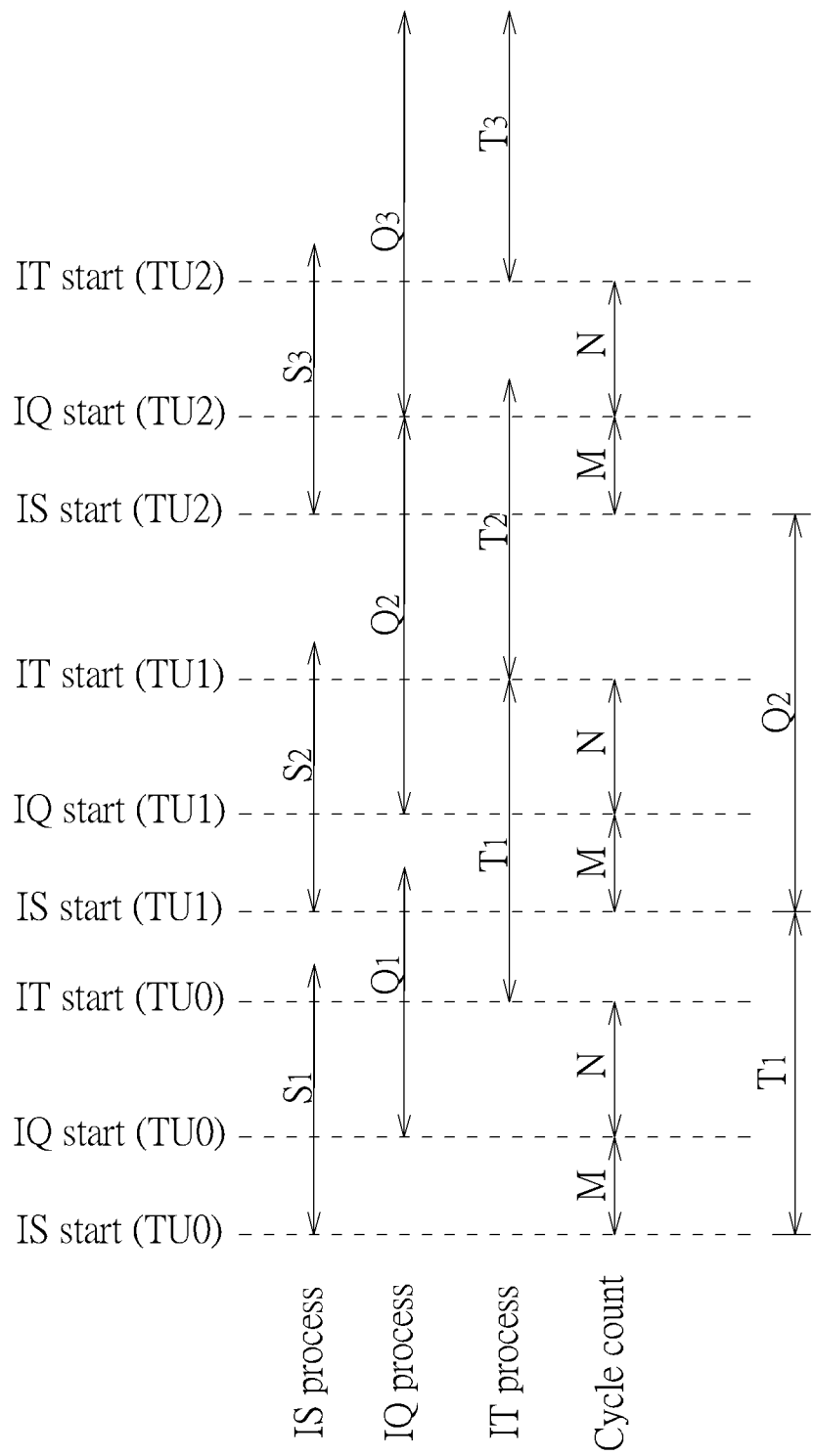
FIG. 4 is a diagram illustrating an SDTP based pipeline control scheme according to an embodiment of the present invention.

FIG. 4 is a diagram illustrating an SDTP based pipeline control scheme according to an embodiment of the present invention. The SDTP based pipeline control scheme may be employed by the single-path controller 102. Due to hardware constraints, inherent IS latency may exist between the start time of the IQ circuit 106 and the start time of the IS circuit 104 (i.e., IS latency=IQ start−IS start), and inherent IQ latency may exist between the start time of the IT circuit 108 and the start time of the IQ circuit 106 (i.e., IQ latency=IT start−IQ start). In this example, the inherent IS latency may have a pre-defined cycle count M (which is a fixed value regardless of non-zero residual data blocks processed), and the inherent IQ latency may have a pre-defined cycle count N (which is a fixed value regardless of non-zero residual data blocks processed).

The single-path controller 102 predicts an IS process cycle count of one non-zero residual data block (e.g., one transform unit) according to at least one of known factors. For example, the known factors may include a residual data block size (e.g., a TU size), a non-zero coefficient number (i.e., the number of non-zero coefficients included in a non-zero residual data block), a pcm_flag (which is used in HEVC coding), etc. The IS process cycle count may be proportional to the residual data block size. The IS process cycle count may be proportional to the non-zero coefficient number. When pcm_flag=1, the IS process cycle count may be set by a smaller value. As shown in FIG. 4, the single-path controller 102 predicts an IS process cycle count $S_1$ of a first transform unit TU0, predicts an IS process cycle count $S_2$ of a second transform unit TU1, and predicts an IS process cycle count $S_3$ of a third transform unit TU2.

Further, the single-path controller 102 predicts an IQ process cycle count of one non-zero residual data block (e.g., one transform unit) according to at least one of known factors. For example, the known factors may include a residual data block size (e.g., a TU size), a non-zero coefficient number (i.e., the number of non-zero coefficients included in a non-zero residual data block), a scaling_list_enable_flag (which is used in HEVC coding), cu_transquant_bypass_flag (which is used in HEVC coding), a weighted quant enabled or not (which is used in AVS2 coding), etc. The IQ process cycle count may be proportional to the residual data block size. The IQ process cycle count may be proportional to the non-zero coefficient number. When scaling_list_enable_list=0, the IQ process cycle count may be set by a smaller value. When cu_transquant_bypass_flag=1, the IQ process cycle count may be set by a smaller value. When the weighted quant is not enabled, the IQ process cycle count may be set by a smaller value. As shown in FIG. 4, the single-path controller 102 predicts an IQ process cycle count $Q_1$ of the first transform unit TU0, predicts an IQ process cycle count $Q_2$ of the second transform unit TU1, and predicts an IQ process cycle count $Q_3$ of the third transform unit TU2.

Moreover, the single-path controller 102 predicts an IT process cycle count of one non-zero residual data block (e.g., one transform unit) according to at least one of known factors. For example, the known factors may include a residual data block size (e.g., a TU size), a non-zero coefficient number (i.e., the number of non-zero coefficients included in a non-zero residual data block), a transform type, cu_transquant_bypass_flag (which is used in HEVC coding), a transform_skip_flag (which is used in HEVC coding), second transform enabled or not (which is used in AVS2 coding), etc. The IT process cycle count may be proportional to the residual data block size. The IT process cycle count may be proportional to the non-zero coefficient number. When cu_transquant_bypass_flag=1, the IT process cycle count may be set by a smaller value. When transform_skip_flag=1, the IT process cycle count may be set by a smaller value. When the second transform is not enabled, the IT process cycle count may be set by a smaller value. As shown in FIG. 4, the single-path controller 102 predicts an IT process cycle count $T_1$ of the first transform unit TU0, predicts an IT process cycle count $T_2$ of the second transform unit TU1, and predicts an IT process cycle count $T_3$ of the third transform unit TU2.

In accordance with the SDTP based pipeline control scheme, the single-path controller 102 predicts a start time of IS circuit 104 for applying IS processing to the next non-zero residual data block (e.g., the next transform unit), a start time of IQ circuit 106 for applying IQ processing to the next non-zero residual data block (e.g., the next transform unit) and a start time of IT circuit 108 for applying IT processing to the next non-zero residual data block (e.g., the next transform unit) according to the following formulas.

$$\text{next TU IS start} = \text{current TU IS start} + \max(S, Q, T) \quad (1)$$

$$\text{next TU IQ start} = \text{current TU IS start} + \max(S, Q, T) + M \quad (2)$$

$$\text{next TU IT start} = \text{current TU IS start} + \max(S, Q, T) + M + N \quad (3)$$

In above formulas, "next TU IS start" represents the start time of IS circuit 104 for applying IS processing to the next non-zero residual data block (e.g., the next transform unit), "next TU IQ start" represents the start time of IQ circuit 106 for applying IQ processing to the next non-zero residual data block (e.g., the next transform unit), "next TU IT start" represents the start time of IT circuit 108 for applying IT processing to the next non-zero residual data block (e.g., the next transform unit), "current TU IS start" represents the start time of IS circuit 104 for applying IS processing to the current non-zero residual data block (e.g., the current transform unit), "current TU IQ start" represents the start time of IQ circuit 106 for applying IQ processing to the current non-zero residual data block (e.g., the current transform unit), "current TU IT start" represents the start time of IT circuit 108 for applying IT processing to the current non-zero residual data block (e.g., the current transform unit), M represents the pre-defined cycle of IQ latency, N represents the pre-defined cycle count of IQ latency, and max(S, Q, T) represent a function for selecting a maximum value from IS process cycle count S, IQ process cycle count Q and IT process cycle count T. The function of max(S, Q, T) used in each of the above formulas (1)-(3) is to ensure that the single-path controller 102 does not instruct a processing module (i.e., any of IS circuit 104, IQ circuit 106 and IT circuit 108) to start processing the next non-zero residual block while the processing module is still processing the current non-zero residual block.

With regard to the pipelined processing of the first transform unit TU0, the predicted IT process cycle count $T_1$ is larger than the predicted IS process cycle count $S_1$ and the predicted IQ process cycle count $Q_1$ (i.e., $\max(S_1, Q_1, T_1)=T_1$). For example, the first transform unit TU0 has a TU size of 32×32 and a transform type of idct, and the second transform unit TU1 has a TU size of 4×4 and a transform type of iadst. Hence, the start time of IS circuit 104 for applying IS processing to the second transform unit TU1 is predicted by a sum of the predicted IT process cycle count $T_1$ and the start time of IS circuit 104 for applying IS processing to the first transform unit TU0.

With regard to the pipelined processing of the second transform unit TU1, the predicted IQ process cycle count $Q_2$ is larger than the predicted IS process cycle count $S_2$ and the predicted IT process cycle count $T_2$ (i.e., $\max(S_2, Q_2, T_2)=Q_2$). For example, the second transform unit TU1 has a TU size of 4×4 and a transform type of iadst, and the third transform unit TU2 has a TU size of 16×16 and a transform type of idct. Hence, the start time of IS circuit 104 for applying IS processing to the third transform unit TU2 is predicted by a sum of the predicted IQ process cycle count $Q_2$ and the start time of IS circuit 104 for applying IS processing to the second transform unit TU1.

Figure 5:
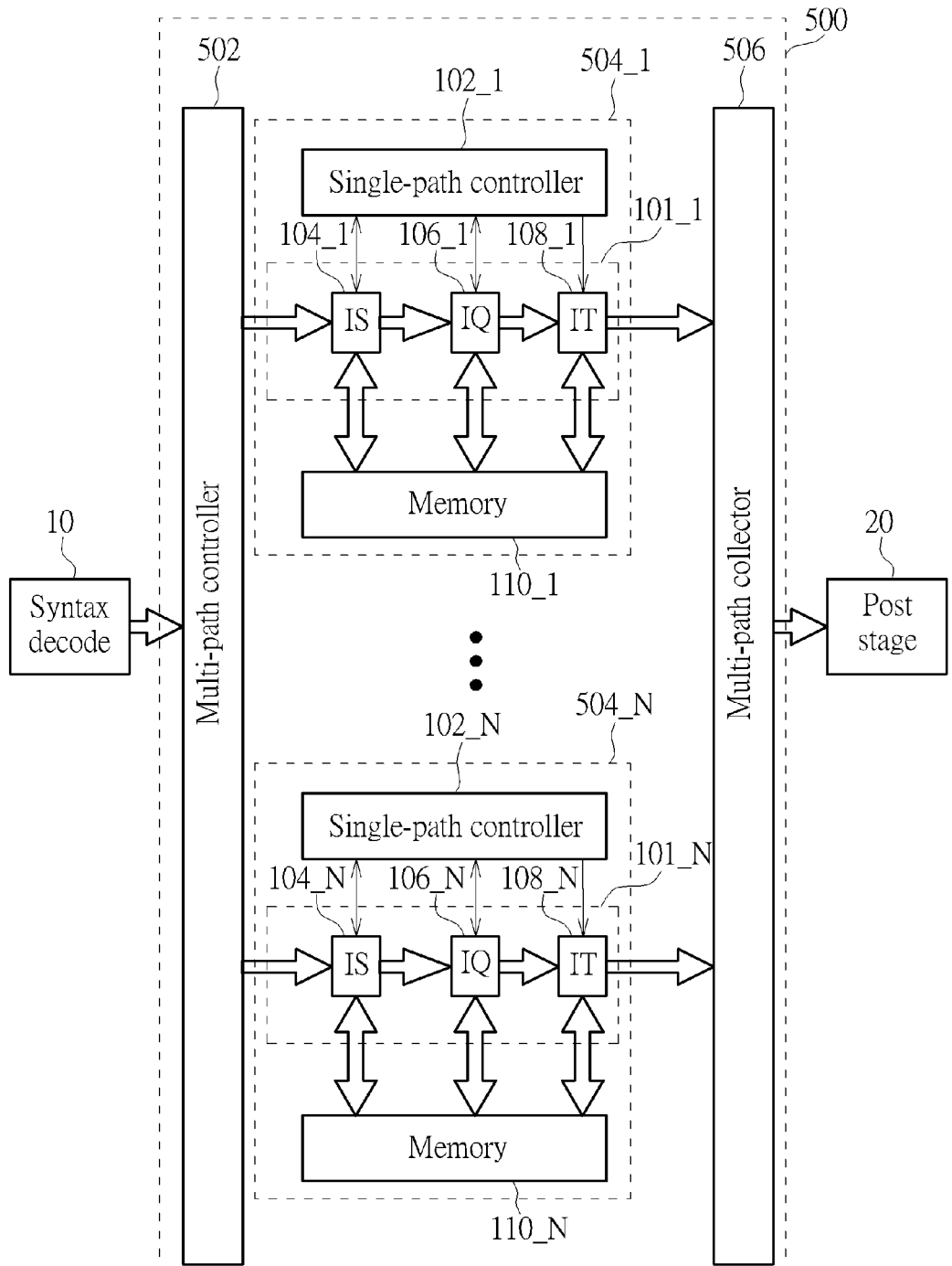
FIG. 5 is a block diagram illustrating a multi-path pipeline based residual processing circuit according to an embodiment of the present invention.

FIG. 5 is a block diagram illustrating a multi-path pipeline based residual processing circuit according to an embodiment of the present invention. By way of example, but not limitation, the multi-path pipeline based residual processing circuit 500 may be a part of a video decoder, such as an HEVC decoder or an AVS2 decoder. The multi-path pipeline based residual processing circuit 500 includes a plurality of parallel residual processing circuits 504_1-504_N, a multi-path controller 502 and a multi-path collector 506, where N is a positive integer not smaller than one. Each of the parallel residual processing circuits 504_1-504_N has a circuit structure same as that of the single-path pipeline based residual processing circuit 100. In this embodiment, a multi-path pipeline in the multi-path pipeline based residual processing circuit 500 is composed of parallel single-path pipelines 101_1-101_N. As shown in FIG. 5, the parallel residual processing circuit 504_1 includes a parallel single-path pipeline 101_1, a single-path controller 102_1 and a storage device (e.g., a memory 110_1), where the parallel single-path pipeline 101_1 includes an inverse scan circuit (denoted by "IS") 104_1, an inverse quantization circuit (denoted by "IQ") 106_1, and an inverse transform circuit (denoted by "IT") 108_1; and the parallel residual processing circuit 504_N includes a parallel single-path pipeline 101_N, a single-path controller 102_N and a storage device (e.g., a memory 110_N), where the parallel single-path pipeline 101_N includes an inverse scan circuit (denoted by "IS") 104_N, an inverse quantization circuit (denoted by "IQ") 106_N, and an inverse transform circuit (denoted by "IT") 108_N.

Like the single-path pipeline based residual processing circuit 100, the multi-path pipeline based residual processing circuit 500 can be coupled between the syntax decoder (denoted by "Syntax decode") 10 and the post stage 20, such that the entropy-decoded residual data is generated from the syntax decoder 10 to the multi-path pipeline based residual processing circuit 500 (particularly, the multi-path controller 502), and pipeline-processed residual data is output from the multi-path collector 506 to the post stage 20 for further processing. Since the present invention focuses on the multi-path pipeline and associated pipeline control, further description of a preceding processing circuit (e.g., syntax decoder 10) and a following processing circuit (e.g., post stage 20) of the multi-path pipeline based residual processing circuit 500 is omitted here for brevity.

In this embodiment, the principle of each of the parallel residual processing circuits 504_1-504_N may be same as that of the single-path pipeline based residual processing circuit 100. The IS circuit 104_1/104_N, IQ circuit 106_1/106_N and IT circuit 108_1/108_N are arranged to process the same non-zero residual data block in a pipeline manner. In this embodiment, the IS circuit 104_1/104_N may act as a single pipeline stage for accomplishing the whole IS process of one non-zero residual data block, the IQ circuit 106_1/106_N may act as a single pipeline stage for accomplishing the whole IQ process of one non-zero residual data block, and the IT circuit 108_1/108_N may have first pipeline stage(s) and second pipeline stage(s) for accomplishing the whole IT process of one non-zero residual data block, where the first pipeline stage(s) are responsible for performing a first one-dimensional (1D) inverse transform, and the second pipeline stage(s) are responsible for performing a second one-dimensional (1D) inverse transform. For example, supposing that the first 1D inverse transform and the second 1D inverse transform are performed in order, a first half of the IT process is the first 1D inverse transform that is performed by first pipeline stage(s), and a second half of the IT process is the second 1D inverse transform that is performed by second pipeline stage(s).

In one exemplary implementation, transform units (TUs) are fed into the parallel single-path pipelines 101_1-101_N. Hence, the non-zero residual data block to be sequentially processed by IS circuit 104_1/104_N, IQ circuit 106_1/106_N and IT circuit 108_1/108_N of the same parallel single-path pipeline 101_1/101_N is one TU. In another exemplary implementation, partial TUs are fed into the parallel single-path pipelines 101_1-101_N. For example, a left part and a right part of the same TU may be fed into the same parallel single-path pipeline or different parallel single-path pipelines. Hence, the non-zero residual data block to be sequentially processed by IS circuit 104_1/104_N, IQ circuit 106_1/106_N and IT circuit 108_1/108_N of the same parallel single-path pipeline 101_1/101_N is merely a portion of one TU. For clarity and simplicity, the following assumes that the parallel single-path pipelines 101_1-101_N are used to process non-zero residual data blocks each being one TU. However, this is for illustrative purposes only, and is not meant to be a limitation of the present invention.

With a proper pipeline control made by the multi-path controller 502_1, the parallel residual processing circuit 504_1 can have high performance by starting IS processing of a next non-zero residual data block before the first half (e.g., the first 1D inverse transform) of IT processing of a current non-zero residual data block is done. Similarly, with a proper pipeline control made by the single-path controller 102_N, the parallel residual processing circuit 504_N can have high performance by starting IS processing of a next non-zero residual data block (which may be at least a portion of one transform unit) before the first half (e.g., the first 1D inverse transform) of IT processing of a current non-zero residual data block is done. Since a person skilled in the art can readily understand details of the parallel residual processing circuits 504_1-504_N shown in FIG. 5 after reading above paragraphs directed to the single-path pipeline based residual processing circuit 100 shown in FIG. 1, further description is omitted here for brevity.

The post stage 20 may have a single input port. Since the multi-path pipeline is composed of parallel single-path pipelines 101_1-101_N (N>1), the multi-path collector 506 is arranged to collect parallel data outputs from the multi-path pipeline (particularly, parallel single-path pipelines 101_1-101_N), and combine the parallel data outputs to generate a serial data input of the post stage 20.

With regard to the multi-path controller 502, it is arranged to control pipelined processing of a plurality of non-zero residual data blocks. For example, after receiving a non-zero residual data block from the preceding processing circuit (e.g., syntax decoder 10), the multi-path controller 502 controls dispatch of the non-zero residual data block, such that the non-zero residual data block is fed into one available parallel single-path pipeline that is selected from the multi-path pipeline (which is composed of parallel single-path pipelines 101_1-101_N). In this way, the multi-path controller 502 can adaptively dispatch non-zero residual data blocks to different parallel single-path pipelines included in the multi-path pipeline for achieving high performance. For example, the multi-path controller 502 instructs one parallel single-path pipeline to start pipelined processing of a next non-zero residual data block before another parallel single-path pipeline finishes the first half (e.g., the first 1D inverse transform) of IT processing of a current non-zero residual data block, wherein the current non-zero residual data block and the next non-zero residual data block are two non-zero residual data blocks successively dispatched by the multi-path controller 502. In this way, the bubble (i.e., idle cycles) associated with each of the parallel single-path pipelines 101_1-101_N implemented in the multi-path pipeline of the multi-path pipeline based residual processing circuit 500 can be avoided or reduced to thereby achieve high performance.

Figure 6:
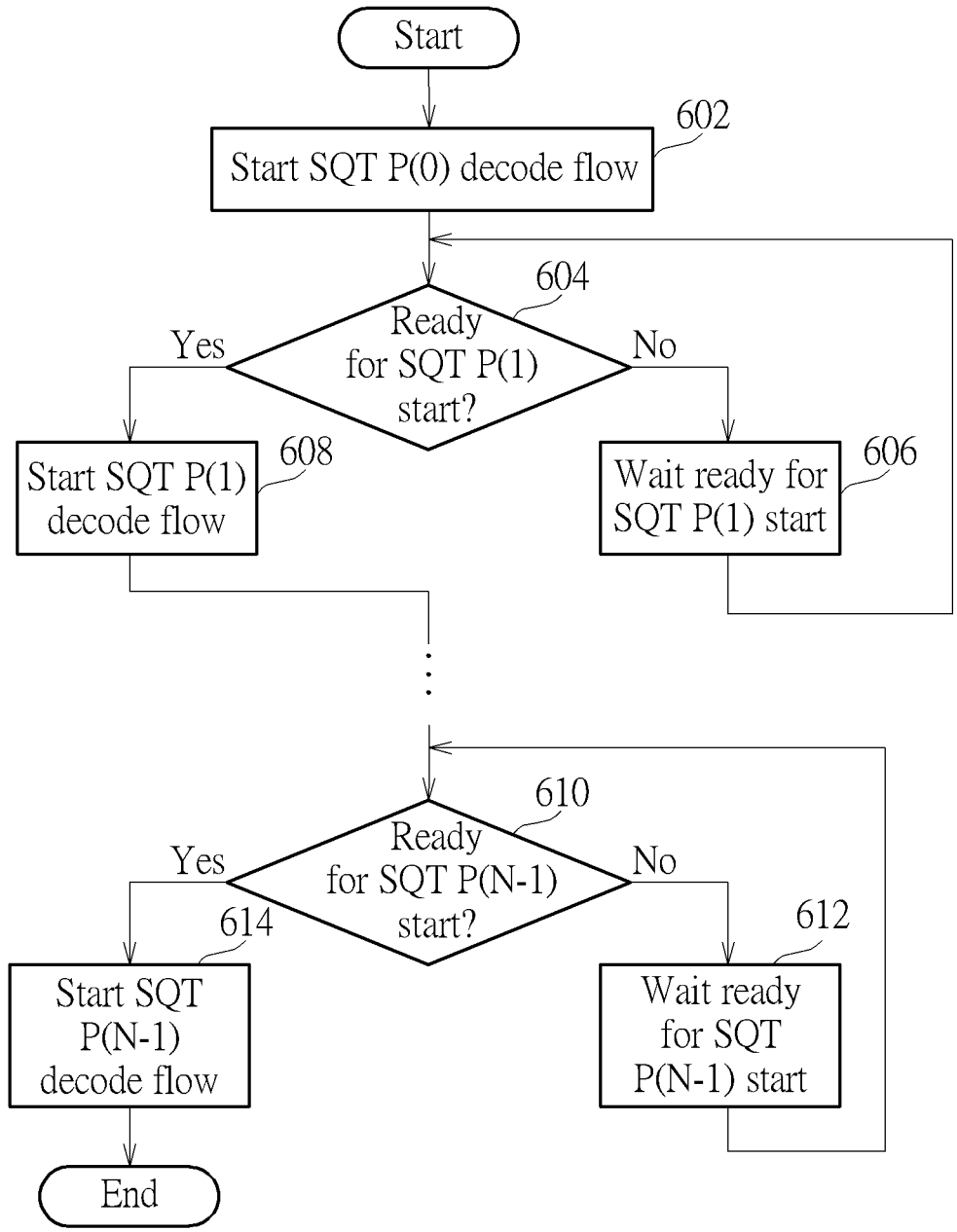
FIG. 6 is a flowchart illustrating a multi-path pipeline based decoding method according to an embodiment of the present invention.

FIG. 6 is a flowchart illustrating a multi-path pipeline based decoding method according to an embodiment of the present invention. The method may be performed by the multi-path pipeline based residual processing circuit 4500. Provided that the result is substantially the same, the steps are not required to be executed in the exact order shown in FIG. 6. In this example, it is assumed that the multi-path controller 502 dispatches non-zero residual data blocks (e.g., transform units) to the parallel single-path pipelines 101_1-101_N sequentially. However, this is for illustrative purposes only, and is not meant to be a limitation of the present invention. The parallel single-path pipelines 101_1-101_N may be represented by SQT P(0), SQT P(1) . . . SQT P(N−1), respectively. Initially, the parallel single-path pipeline SQT P(0) is allowed to start pipelined processing of a first non-zero residual data block (e.g., a first TU of a picture to be decoded) due to the fact that the parallel single-path pipeline SQT P(0) is idle and ready of pipelined process start is confirmed. At step 602, the multi-path controller 502 dispatches the first non-zero residual data block to the parallel single-path pipeline SQT P(0), and instructs the parallel single-path pipeline SQT P(0) to start pipelined processing of the first non-zero residual data block. At step 604, the multi-path controller 502 checks if the parallel single-path pipeline SQT P(1) is ready to start pipelined processing of a second non-zero residual data block (e.g., a second TU of the picture to be decoded). If the parallel single-path pipeline SQT P(1) is not ready to start pipelined processing of the second residual data block, the multi-path controller 502 waits for ready of the pipelined process start (Step 606), and keeps checking if the parallel single-path pipeline SQT P(1) is ready to start pipelined processing of the second residual data block (Step 604). However, if ready of the pipelined process start is confirmed at step 604, the flow proceeds with step 608. At step 608, the multi-path controller 502 dispatches the second non-zero residual data block to the parallel single-path pipeline SQT P(1), and instructs the parallel single-path pipeline SQT P(1) to start pipelined processing of the second non-zero residual data block.

The same dispatch control flow is applied to each of the parallel single-path pipelines SQT P(0)-SQT P(N−1). At step 610, the multi-path controller 502 checks if the parallel single-path pipeline SQT P(N−1) is ready to start pipelined processing of an $N^{th}$ non-zero residual data block (e.g., an $N^{th}$ TU of the picture to be decoded). If the parallel single-path pipeline SQT P(N−1) is not ready to start pipelined processing of the $N^{th}$ non-zero residual data block, the multi-path controller 502 waits for ready of the pipelined process start (Step 612), and keeps checking if the parallel single-path pipeline SQT P(N−1) is ready to start pipelined processing of the $N^{th}$ non-zero residual data block (Step 610). However, if ready of the pipelined process start is confirmed at step 610, the flow proceeds with step 614. At step 614, the multi-path controller 502 dispatches the $N^{th}$ non-zero residual data block to the parallel single-path pipeline SQT P(N−1), and instructs the parallel single-path pipeline SQT P(N−1) to start pipelined processing of the $N^{th}$ non-zero residual data block.

It should be noted that the multi-path controller 502 is allowed to dispatch a non-zero residual data block to a selected parallel single-path pipeline and instruct the selected parallel single-path pipeline to start pipelined processing of the dispatched non-zero residual data block when the selected parallel single-path pipeline is confirmed to be ready/available to process one residual data block. Similarly, the multi-path controller 502 is allowed to dispatch another non-zero residual data block to another selected parallel single-path pipeline and instruct the another selected parallel single-path pipeline to start pipelined processing of the another dispatched non-zero residual data block when the another selected parallel single-path pipeline is confirmed to be ready/available to process one residual data block. Since selection of one available parallel single-path pipeline for processing one non-zero residual data block is independent of selection of another available parallel single-path pipeline for processing another non-zero residual data block, it is possible that one parallel single-path pipeline is ready to process a next non-zero residual data block before another parallel single-path pipeline finishes the first half (e.g., the first 1D inverse transform) of pipelined processing of the current non-zero residual data block. Since the pipeline process start of the next non-zero residual data block does not need to wait for the finish of the first half (e.g., the first 1D inverse transform) of pipelined processing of the current non-zero residual data block, the bubble (i.e., idle cycles) of the parallel single-path pipeline can be avoided/reduced. More specifically, since each of the parallel single-path pipelines benefits from the proposed pipeline control made by the multi-path controller 502, the bubble (i.e., idle cycles) of each parallel single-path pipeline can be avoided/reduced.

Figure 7:
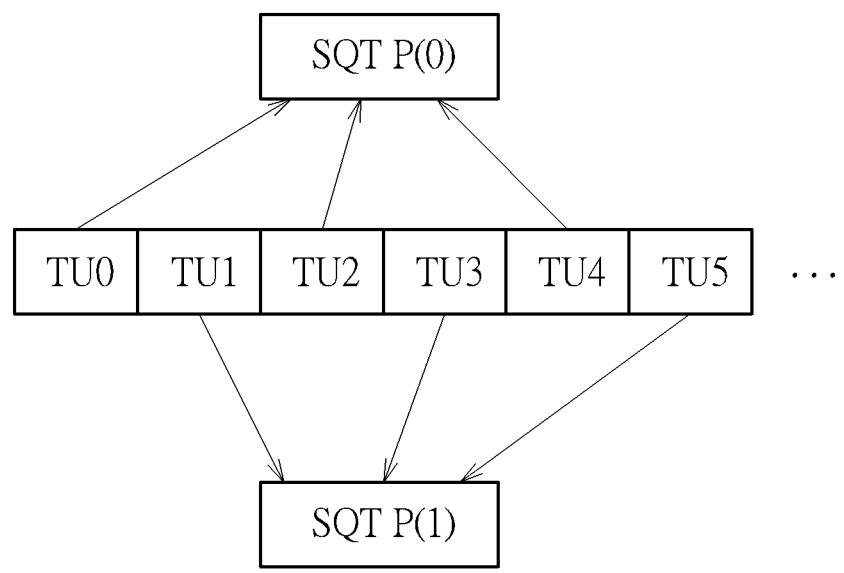
FIG. 7 is a diagram illustrating a first dispatch scheme according to an embodiment of the present invention.

FIG. 7 is a diagram illustrating a first dispatch scheme according to an embodiment of the present invention. The non-zero residual data blocks (e.g., transform units or partial transform units) may be categorized into a plurality of block groups $G_1$-$G_N$ according to an order of the non-zero residual data blocks received by the multi-path controller 502, where non-zero residual data blocks belonging to the same block groups $G_1$ are sequentially dispatched to the parallel single-path pipeline 101_i, where 1≤i≤N. In other words, the multi-path controller 502 dispatches the non-zero residual data blocks to the parallel single-path pipelines 101_1-101_N, sequentially and cyclically, according to an order of the non-zero residual data blocks received by the multi-path controller 502. For example, the $(N*K+i)^{th}$ non-zero residual data blocks are dispatched to the parallel single-path pipelines 101_i, where K is a non-negative integer such as 0, 1, 2, 3, etc. Suppose that the multi-path pipeline includes two parallel single-path pipelines SQT P(0) and SQT P(1). As shown in FIG. 7, the transform units TU0, TU2 and TU4 are sequentially dispatched to the parallel single-path pipeline SQT P(0). The parallel single-path pipeline SQT P(0) is instructed to start pipelined processing of one of the transform units TU0, TU2 and TU4 when ready of pipeline process start is confirmed by the multi-path controller 502. In addition, as shown in FIG. 7, the transform units TU1, TU3 and TU5 are sequentially dispatched to the parallel single-path pipeline SQT P(0). The parallel single-path pipeline SQT P(1) is instructed to start pipelined processing of one of the transform units TU1, TU3 and TU5 when ready of pipeline process start is confirmed by the multi-path controller 502.

Figure 8:
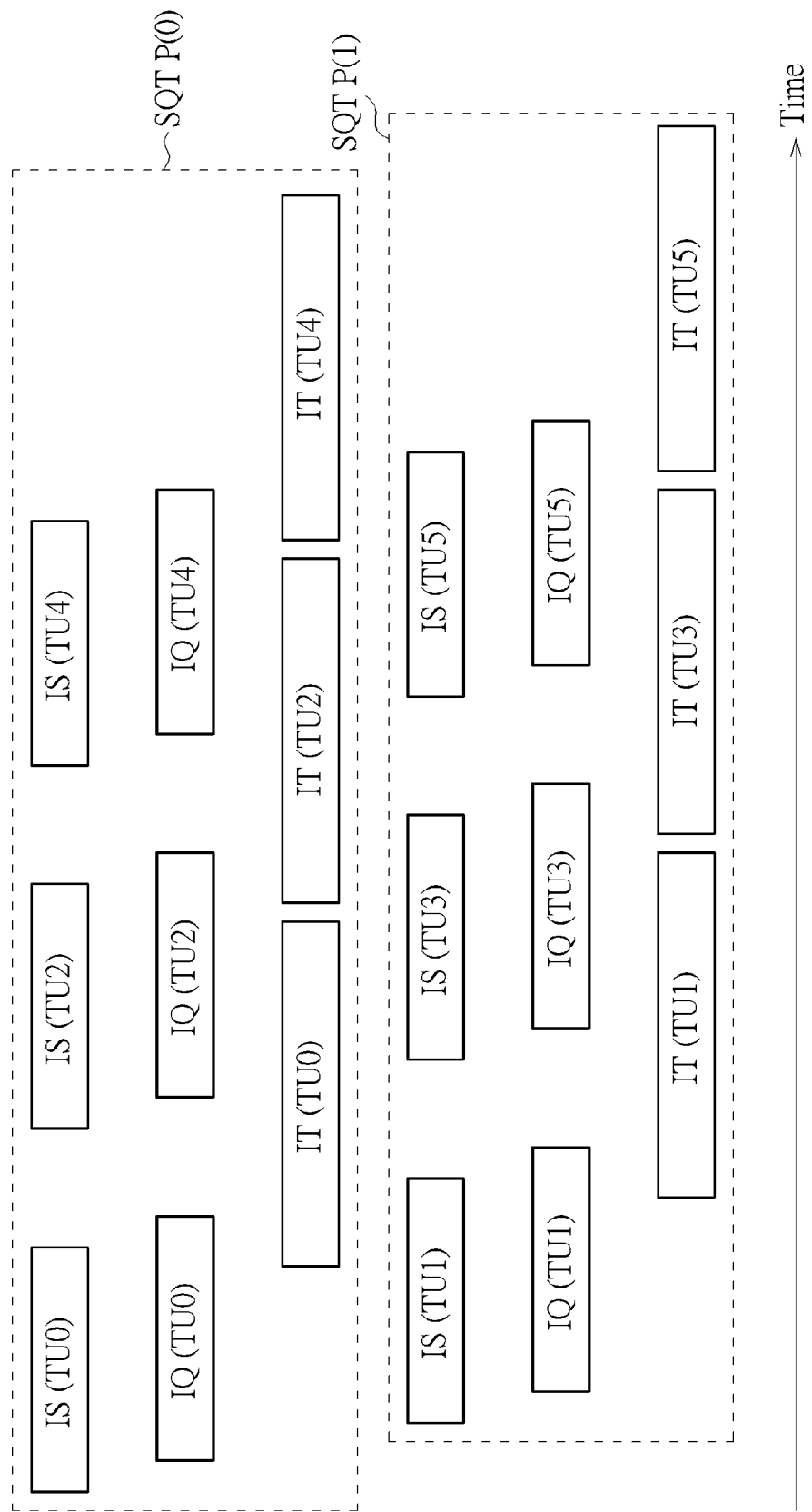
FIG. 8 is a diagram illustrating a multi-path pipeline based decoding operation according to an embodiment of the present invention.

FIG. 8 is a diagram illustrating a multi-path pipeline based decoding operation according to an embodiment of the present invention. Suppose that the multi-path pipeline includes two parallel single-path pipelines SQT P(0) and SQT P(1), and non-zero residual data blocks (e.g., transform units TU0-TU4) are dispatched to the parallel single-path pipelines SQT P(0) and SQT P(1), sequentially and cyclically, according to an order of the non-zero residual data blocks (e.g., transform units TU0-TU4). As shown in FIG. 8, the multi-path controller 502 instructs the parallel single-path pipeline SQT P(0) to start pipelined processing of the transform unit TU0 when ready of pipeline process start is confirmed, instructs the parallel single-path pipeline SQT P(0) to start pipelined processing of the transform unit TU2 when ready of pipeline process start is confirmed, and instructs the parallel single-path pipeline SQT P(0) to start pipelined processing of the transform unit TU4 when ready of pipeline process start is confirmed. Similarly, the multi-path controller 502 instructs the parallel single-path pipeline SQT P(1) to start pipelined processing of the transform unit TU1 when ready of pipeline process start is confirmed, instructs the parallel single-path pipeline SQT P(1) to start pipelined processing of the transform unit TU3 when ready of pipeline process start is confirmed, and instructs the parallel single-path pipeline SQT P(1) to start pipelined processing of the transform unit TU5 when ready of pipeline process start is confirmed. As shown in FIG. 8, the parallel single-path pipeline SQT P(1) starts pipelined processing of the transform unit TU1 before the parallel single-path pipeline SQT P(0) finishes the first half (e.g., the first 1D inverse transform) of IT processing of the transform unit TU0; the parallel single-path pipeline SQT P(0) starts pipelined processing of the transform unit TU2 before the parallel single-path pipeline SQT P(1) finishes the first half (e.g., the first 1D inverse transform) of IT processing of the transform unit TU1; the parallel single-path pipeline SQT P(1) starts pipelined processing of the transform unit TU3 before the parallel single-path pipeline SQT P(0) finishes the first half (e.g., the first 1D inverse transform) of IT processing of the transform unit TU2; the parallel single-path pipeline SQT P(0) starts pipelined processing of the transform unit TU4 before the parallel single-path pipeline SQT P(1) finishes the first half (e.g., the first 1D inverse transform) of IT processing of the transform unit TU3; and the parallel single-path pipeline SQT P(1) starts pipelined processing of the transform unit TU5 before the parallel single-path pipeline SQT P(0) finishes pipelined processing of the first half (e.g., the first 1D inverse transform) of IT processing of the transform unit TU4. In this way, high performance pipeline architecture is achieved.

In one exemplary design, the multi-path controller 502 confirms ready of pipeline process start associated with each parallel single-path pipeline included in the multi-path pipeline by monitoring a processing progress of each parallel single-path pipeline in a realtime manner. Hence, the multi-path controller 502 selectively dispatches one non-zero residual data block to a parallel single-path pipeline according to the monitored processing progress of the parallel single-path pipeline. For example, regarding the first dispatch scheme, the multi-path controller 502 may dispatch one of the $(N*K+i)^{th}$ non-zero residual data blocks to the parallel single-path pipelines 101_i when the real-time monitoring result indicates that the parallel single-path pipeline 101_i becomes idle. For another example, the real-time monitoring results of the parallel single-path pipelines 101_1-101_N may be referenced by the multi-path controller 502 that uses a second dispatch scheme. In accordance with the second dispatch scheme, non-zero residual data blocks are dispatched to available parallel single-path pipelines adaptively selected from the multi-path pipeline, thereby achieving load balance of the parallel single-path pipelines 101_1-101_N. Further details of the second dispatch scheme will be described later.

In another exemplary design, the multi-path controller 502 confirms ready of pipeline process start associated with each parallel single-path pipeline included in the multi-path pipeline by checking an availability status associated with each parallel single-path pipeline. In this way, adaptive dispatch of non-zero residual data blocks can be performed to achieve load balance of the parallel single-path pipelines 101_1-101_N. The availability status may be determined by checking one or more factors. For example, the factors may include an available memory space of each parallel single-path pipeline, a stall status of each parallel single-path pipeline, and/or a predicted available time of each parallel single-path pipeline.

In a first exemplary design, the multi-path controller 502 checks an available memory space associated with one parallel single-path pipeline, and selectively dispatches one non-zero residual data block to the parallel single-path pipeline according to at least the checked available memory space. For example, when a specific parallel single-path pipeline does not have enough memory space available for processing a new non-zero residual data block, the specific parallel single-path pipeline is not regarded as an available parallel single-path pipeline that can be selected by the multi-path controller 502 for processing a non-zero residual data block currently waiting for dispatch.

In a second exemplary design, the multi-path controller 502 checks a stall status of one parallel single-path pipeline, and selectively dispatches one non-zero residual data block to the parallel single-path pipeline according to at least the checked stall status. In a case where a following circuit (e.g., post stage 20) is unable to process the processed data generated from a parallel single-path pipeline, the following circuit (e.g., post stage 20) may generate a stall command to the parallel single-path pipeline for stopping the pipeline processing performed at the parallel single-path pipeline. Hence, when a specific parallel single-path pipeline is stalled and thus unable to process a new non-zero residual data block, the specific parallel single-path pipeline is not regarded as an available parallel single-path pipeline that can be selected by the multi-path controller 502 for processing a non-zero residual data block currently waiting for dispatch.

In a third exemplary design, the multi-path controller 502 predicts an available time of one parallel single-path pipeline, and selectively dispatches one non-zero residual data block to the parallel single-path pipeline according to at least the predicted available time. For example, if the predicted available time of a specific parallel single-path pipeline is not closest to the current time among predicted available times of all parallel single-path pipelines, the specific parallel single-path pipeline is not regarded as an available parallel single-path pipeline that can be selected by the multi-path controller 502 for processing a non-zero residual data block currently waiting for dispatch.

In a fourth exemplary design, two or all of the factors, including an available memory space of each parallel single-path pipeline, a stall status of each parallel single-path pipeline and a predicted available time of each parallel single-path pipeline, may be jointly considered to select one available parallel single-path pipeline from the multi-path pipeline.

The operation of predicting an available time of one parallel single-path pipeline is similar to the operation performed by the aforementioned smart datapath throughput prediction (SDTP) scheme. For example, the multi-path controller 502 predicts an IS process cycle count used by an IS circuit of a parallel single-path pipeline for applying IS processing to a non-zero residual data block currently waiting for dispatch, predicts an IQ process cycle count used by an IQ circuit of the parallel single-path pipeline for applying IQ processing to the non-zero residual data block currently waiting for dispatch, predicts an IT process cycle count used by an IT circuit of the parallel single-path pipeline for applying IT processing to the non-zero residual data block currently waiting for dispatch, selects a maximum value from the IS process cycle count, the IQ process cycle count and the IT process cycle count, and predicts the available time of the parallel single-path pipeline by a sum of the maximum value and a start time of the parallel single-path pipeline for applying pipelined processing of an already dispatched non-zero residual data block.

As mentioned above, an IS process cycle count is a variable that depends on at least one of known factors, such as a residual data block size (e.g., a TU size), a non-zero coefficient number, and a pcm_flag (which is used in HEVC coding); an IQ process cycle count of one non-zero residual data block is a variable that depends on at least one of known factors, such as a residual data block size (e.g., a TU size), a non-zero coefficient number, a scaling_list_enable_flag (which is used in HEVC coding), cu_transquant_bypass_flag (which is used in HEVC coding), and a weighted quant enabled or not (which is used in AVS2 coding); and an IT process cycle count of one non-zero residual data block is a variable that depends on at least one of known factors, such as a residual data block size (e.g., a TU size), a non-zero coefficient number, a transform type, cu_transquant_bypass_flag (which is used in HEVC coding), a transform skip flag (which is used in HEVC coding), and second transform enabled or not (which is used in AVS2 coding).

Figure 9:
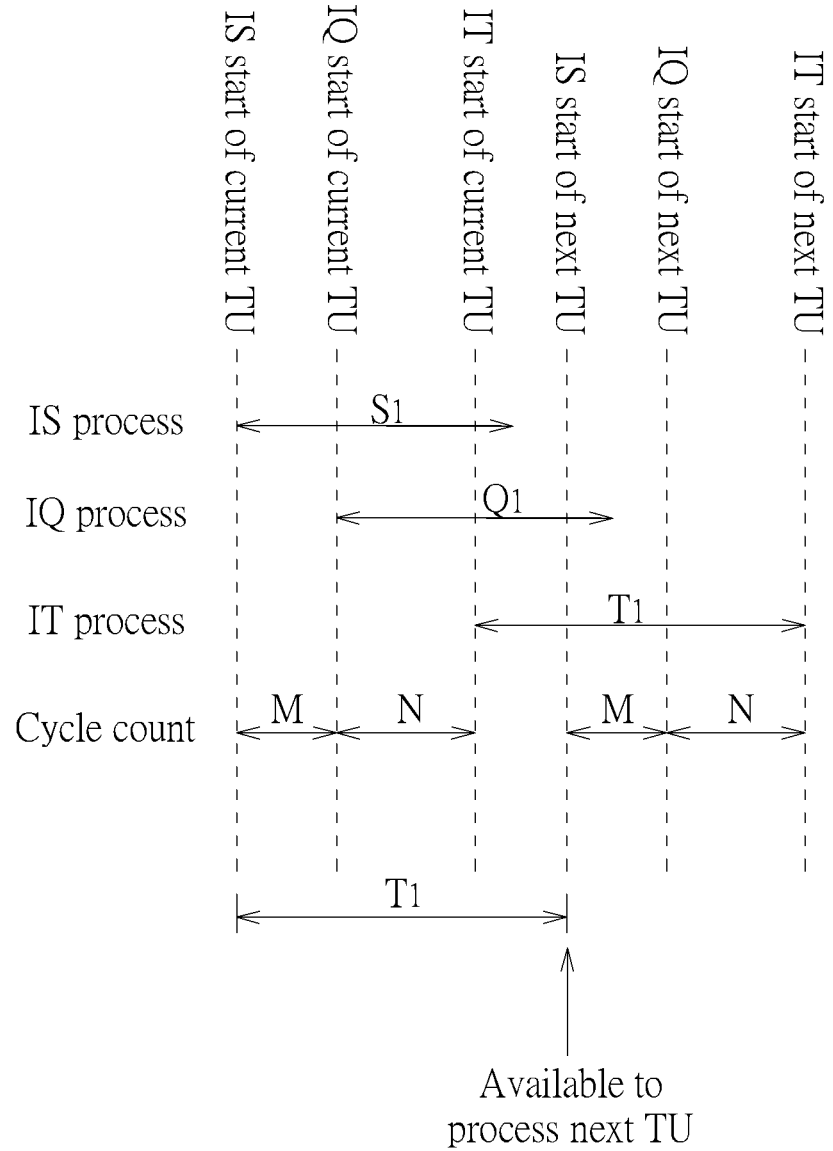
FIG. 9 is a diagram illustrating an operation of predicting an available time of one parallel single-path pipeline according to an embodiment of the present invention.

FIG. 9 is a diagram illustrating an operation of predicting an available time of one parallel single-path pipeline according to an embodiment of the present invention. Due to hardware constraints, inherent IS latency exists between the start time of an IQ circuit 106_1/106_N and the start time of an IS circuit 104_1/104_N (i.e., IS latency=IQ start−IS start), and inherent IQ latency exists between the start time of an IT circuit 108_1/108_N and the start time of an IQ circuit 106_1/106_N (i.e., IQ latency=IT start−IQ start). In this example, the inherent IS latency has a pre-defined cycle count M (which is a fixed value regardless of non-zero residual data blocks processed), and the inherent IQ latency has a pre-defined cycle count N (which is a fixed value regardless of non-zero residual data blocks processed). In accordance with the principle of the SDTP scheme, the multiple-path controller 102 predicts an IS process cycle count $S_1$ associated with a non-zero residual data block currently being processed by the parallel single-path pipeline, an IQ process cycle count $Q_1$ associated with the non-zero residual data block currently being processed by the parallel single-path pipeline, and an IT process cycle count $T_1$ associated with the non-zero residual data block currently being processed by the parallel single-path pipeline. The multi-path controller 502 may calculate an available time of the parallel single-path pipeline for processing a new non-zero residual data block by using the following formula.

$$\text{available time} = \text{current TU start} + \max(S, Q, T) \quad (4)$$

In above formula, "current TU start" represents the start time of the parallel single-path pipeline for applying pipelined processing to a non-zero residual data block (e.g., a transform unit dispatched to the parallel single-path pipeline), and max(S, Q, T) represent a function for selecting a maximum value from IS process cycle count S, IQ process cycle count Q and IT process cycle count T predicted for the parallel single-path pipeline.

With regard to the pipelined processing of the first transform unit TU0, the predicted IT process cycle count $T_1$ is larger than the predicted IS process cycle count $S_1$ and the predicted IQ process cycle count $Q_1$ (i.e., $\max(S_1, Q_1, T_1)=T_1$). Hence, the available time of the parallel single-path pipeline for applying pipelined processing to a new non-zero residual data block (e.g., a next non-zero residual data block) is predicted by a sum of the predicted IT process cycle count $T_1$ and the start time of the parallel single-path pipeline for applying pipelined processing to a current non-zero residual data block.

Figure 10:
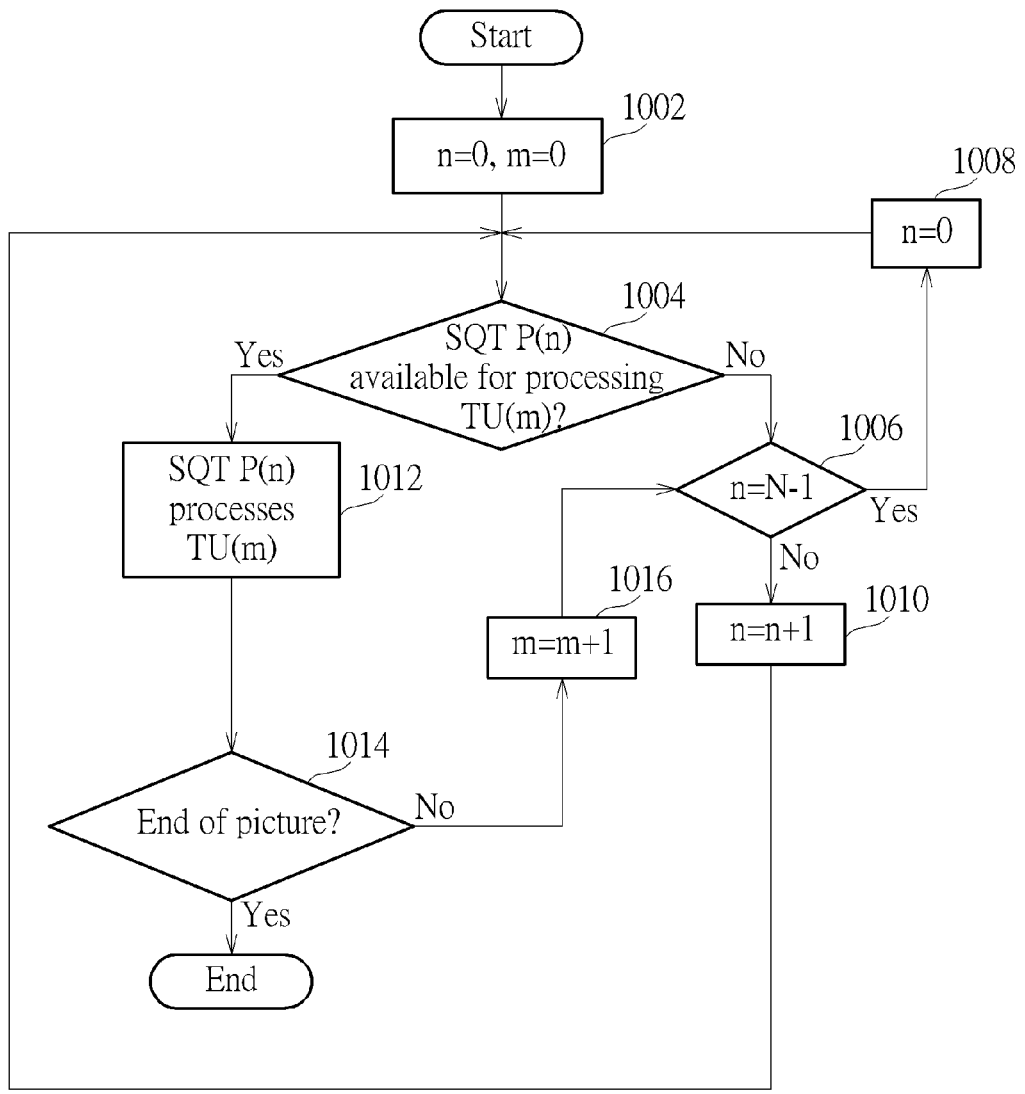
FIG. 10 is a flowchart illustrating a method of dispatching non-zero residual data blocks to available parallel single-path pipelines adaptively selected from the multi-path pipeline according to an embodiment of the present invention.

FIG. 10 is a flowchart illustrating a method of dispatching non-zero residual data blocks to available parallel single-path pipelines adaptively selected from the multi-path pipeline according to an embodiment of the present invention. The method may be performed by the multi-path pipeline based residual processing circuit 500. Provided that the result is substantially the same, the steps are not required to be executed in the exact order shown in FIG. 10. At step 1002, two variables m and n are initialized. For example, m=0 and n=0. In this embodiment, the variable m serves as a transform unit index, and the variable n serves as a parallel single-path pipeline index. At step 1004, the multi-path controller 502 checks if the parallel single-path pipeline SQT P(0) is available to process a non-zero residual data block (e.g., transform unit T(0)). If the parallel single-path pipeline SQT P(0) is not available to process the non-zero residual data block (e.g., transform unit T(0)), the flow proceeds with step 1006 to check if the last parallel single-path pipeline SQT P(N−1) has been found unavailable to process the non-zero residual data block (e.g., transform unit T(0)). At step 1006, the multi-path controller 502 checks if the variable n is equal to (N−1). If n=N−1, the flow proceeds with step 1008 to re-initialize the variable n, and then proceeds with step 1004 to check if the parallel single-path pipeline SQT P(0) is available to process the non-zero residual data block (e.g., transform unit T(0)) at this moment. If step 1006 finds that the variable n is not equal to (N−1), the flow proceeds with step 1010 to update the variable n, and then proceeds with step 1004 to check if the next parallel single-path pipeline SQT P(1) is available to process the non-zero residual data block (e.g., transform unit T(0)).

If step 1004 determines that the parallel single-path pipeline SQT P(0) is available to process the non-zero residual data block (e.g., transform unit T(0)), the flow proceeds with step 1012. At step 1012, the multi-path controller 502 dispatches the non-zero residual data block (e.g., transform unit T(0)) to the available parallel single-path pipeline SQT P(0), and instructs the parallel single-path pipeline SQT P(0) to start pipelined processing of the dispatched non-zero residual data block (e.g., transform unit T(0)). At step 1014, the multi-path controller 502 checks if the decoding process has reached an end of a picture. That is, after the last non-zero residual data block of a picture is dispatched to one available parallel single-path pipeline, it is determined that the decoding process has reached the end of the picture. Since the dispatched non-zero residual data block (e.g., transform unit T(0)) is not the last non-zero residual data block of the picture to be decoded, the flow proceeds with step 1016 to update the variable m, such that the next non-zero residual data block (e.g., transform unit T(1)) waits for dispatch. By properly updating the variable m, each of the non-zero residual data blocks in the same picture is dispatched by the multi-path controller 502. In addition, by properly updating the variable n, one available parallel single-path pipeline is found in the multi-path pipeline for processing one non-zero residual data block currently waiting for dispatch.

Figure 11:
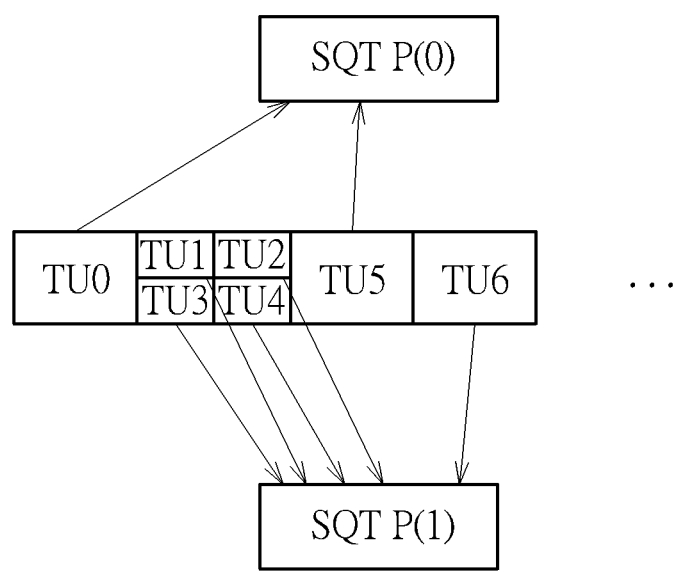
FIG. 11 is a diagram illustrating a second dispatch scheme according to an embodiment of the present invention.

FIG. 11 is a diagram illustrating a second dispatch scheme according to an embodiment of the present invention. The multi-path controller 502 dispatches non-zero residual data blocks to available parallel single-path pipelines adaptively selected from the multi-path pipeline, thereby achieving load balance of the parallel single-path pipelines 101_1-101_N. Suppose that the multi-path pipeline includes two parallel single-path pipelines SQT P(0) and SQT P(1) as shown in FIG. 11. The transform unit TU0 is dispatched to the parallel single-path pipeline SQT P(0). Since the transform unit TU0 has a TU size that is four times as large as a TU size of each of the following transform units TU1-TU4, the parallel single-path pipeline SQT P(0) is not available for processing each of transform units TU1-TU4 at the time each of transform units TU1-TU4 is waiting for dispatch. Hence, the multi-path controller 502 dispatches the transform units TU1-TU4 to the available parallel single-path pipeline SQT P(1) one by one. The parallel single-path pipeline SQT P(1) is not available for processing the transform unit TU5 at the time the transform unit TU5 is waiting for dispatch. Hence, the multi-path controller 502 dispatches the transform unit TU5 to the available parallel single-path pipeline SQT P(0). The parallel single-path pipeline SQT P(0) is not available for processing the transform unit TU6 at the time the transform unit TU6 is waiting for dispatch. Hence, the multi-path controller 502 dispatches the transform unit TU6 to the available parallel single-path pipeline SQT P(1).

As mentioned above, one non-zero residual data block to be dispatched by the multi-path controller 502 may be one full transform unit or one partial transform unit, depending upon the actual design considerations. In a case where non-zero residual data blocks to be dispatched by the multi-path controller 502 are partial transform units, different pixels of the same transform unit may be processed by different parallel single-path pipelines in the multi-path pipeline at the same time. For example, one non-zero transform unit may be divided into a left part and a right part, and the left part and the right part may be dispatched to two parallel single-path pipelines.

Figure 12:
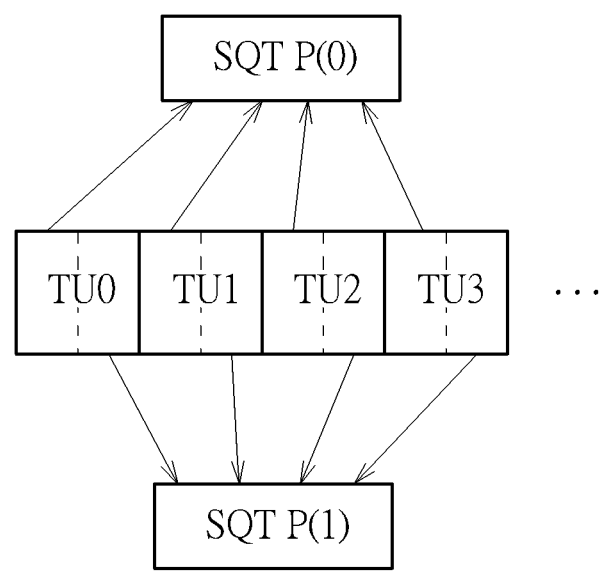
FIG. 12 is a diagram illustrating a third dispatch scheme according to an embodiment of the present invention.

FIG. 12 is a diagram illustrating a third dispatch scheme according to an embodiment of the present invention. Suppose that the multi-path pipeline includes two parallel single-path pipelines SQT P(0) and SQT P(1). As shown in FIG. 12, the multi-path controller 502 dispatches left parts of transform units TU0-TU3 to the parallel single-path pipeline SQT P(0) sequentially, and dispatches right parts of transform units TU0-TU3 to the parallel single-path pipeline SQT P(0) sequentially.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A residual processing circuit comprising:
   a single-path pipeline, comprising an inverse scan (IS) circuit, an inverse quantization (IQ) circuit and an inverse transform (IT) circuit arranged to process a current non-zero residual data block in a pipeline manner, wherein the current non-zero residual data block is at least a portion of a transform unit; and
   a single-path controller, arranged to control pipelined processing of the current non-zero residual data block at the single-path pipeline, wherein the single-path controller instructs the IS circuit to start IS processing of a next non-zero residual data block before the IT circuit finishes a first half of IT processing of the current non-zero residual data block.

2. The residual processing circuit of claim 1, wherein the single-path controller monitors processing progresses of the IS circuit, the IQ circuit and the IT circuit, and adaptively controls the pipelined processing of the current non-zero residual data block according to the monitored processing progresses.

3. The residual processing circuit of claim 1, wherein the single-path controller predicts a start time of the IS circuit for applying IS processing to the current non-zero residual data block, a start time of the IQ circuit for applying IQ processing to the current non-zero residual data block, and a start time of the IT circuit for applying IT processing to the current non-zero residual data block, and controls the pipelined processing of the current non-zero residual data block according to the predicted start time of the IS circuit, the predicted start time of the IQ circuit and the predicted start time of the IT circuit.

4. The residual processing circuit of claim 3, wherein the single-path controller predicts an IS process cycle count of the current non-zero residual data block, predicts an IQ process cycle count of the current non-zero residual data block, predicts an IT process cycle count of the current non-zero residual data block, selects a maximum value from the IS process cycle count, the IQ process cycle count and the IT process cycle count, and predicts the start time of the IS circuit by a sum of the maximum value and a start time of the IS circuit for applying IS processing to a previous non-zero residual data block.

5. The residual processing circuit of claim 3, wherein the single-path controller predicts an IS process cycle count of the current non-zero residual data block, predicts an IQ process cycle count of the current non-zero residual data block, predicts an IT process cycle count of the current non-zero residual data block, selects a maximum value from the IS process cycle count, the IQ process cycle count and the IT process cycle count, and predicts the start time of the IQ circuit by a sum of the maximum value, a start time of the IS circuit for applying IS processing to a previous non-zero residual data block, and a pre-defined cycle count of latency between the start time of the IQ circuit and the start time of the IS circuit.

6. The residual processing circuit of claim 3, wherein the single-path controller predicts an IS process cycle count of the current non-zero residual data block, predicts an IQ process cycle count of the current non-zero residual data block, predicts an IT process cycle count of the current non-zero residual data block, selects a maximum value from the IS process cycle count, the IQ process cycle count and the IT process cycle count, and predicts the start time of the IT circuit by a sum of the maximum value, a start time of the IS circuit for applying IS processing to a previous non-zero residual data block, a pre-defined cycle count of latency between the start time of the IQ circuit and the start time of the IS circuit, and a pre-defined cycle count of latency between the start time of the IT circuit and the start time of the IQ circuit.

7. A residual processing circuit comprising:
a multi-path pipeline, comprising:
   a plurality of parallel single-path pipelines, each comprising an inverse scan (IS) circuit, an inverse quantization (IQ) circuit and an inverse transform (IT) circuit arranged to process a non-zero residual data block in a pipeline manner, wherein the non-zero residual data block is at least a portion of a transform unit, and the parallel single-path pipelines comprise at least a first single-path pipeline and a second single-path pipeline; and
a multi-path controller, arranged to control pipelined processing of a plurality of non-zero residual data blocks, wherein the multi-path controller instructs the second single-path pipeline to start pipelined processing of a next non-zero residual data block before the first single-path pipeline finishes a first half of IT processing of a current non-zero residual data block.

8. The residual processing circuit of claim 7, wherein the multi-path controller dispatches the non-zero residual data blocks to the parallel single-path pipelines, sequentially and cyclically, according to an order of the non-zero residual data blocks.

9. The residual processing circuit of claim 7, wherein the multi-path controller checks availability of at least one of the parallel single-path pipelines to generate a checking result, and dispatches one of the non-zero residual data blocks to one available single-path pipeline that is selected from the multi-path pipeline according to the checking result.

10. The residual processing circuit of claim 7, wherein the multi-path controller monitors a processing progress of one single-path pipeline, and selectively dispatches one non-zero residual data block to said one single-path pipeline according to the monitored processing progress.

11. The residual processing circuit of claim 7, wherein the multi-path controller checks an available memory space associated with one single-path pipeline, and selectively dispatches one non-zero residual data block to said one single-path pipeline according to at least the checked available memory space.

12. The residual processing circuit of claim 7, wherein the multi-path controller checks a stall status of one single-path pipeline, and selectively dispatches one non-zero residual data block to said one single-path pipeline according to at least the checked stall status.

13. The residual processing circuit of claim 7, wherein the multi-path controller predicts an available time of one single-path pipeline, and selectively dispatches one non-zero residual data block to said one single-path pipeline according to at least the predicted available time.

14. The residual processing circuit of claim 13, wherein the multi-path controller predicts an IS process cycle count used by the IS circuit of said one single-path pipeline for applying IS processing to said one non-zero residual data block, predicts an IQ process cycle count used by the IQ circuit of said one single-path pipeline for applying IQ processing to said one non-zero residual data block, predicts an IT process cycle count used by the IT circuit of said one single-path pipeline for applying IT processing to said one non-zero residual data block, selects a maximum value from the IS process cycle count, the IQ process cycle count and the IT process cycle count, and predicts the available time by a sum of the maximum value and a start time of said one single-path pipeline.

15. The residual processing circuit of claim 7, further comprising:
a multi-path collector, arranged to collect parallel data outputs from the multi-path pipeline, and combine the parallel data outputs to generate a serial data input of a following processing circuit.

16. A residual processing method comprising:
utilizing a single-path pipeline to process a current non-zero residual data block in a pipeline manner, wherein the single-path pipeline comprises an inverse scan (IS) circuit, an inverse quantization (IQ) circuit and an inverse transform (IT) circuit, and the current non-zero residual data block is at least a portion of a transform unit; and
controlling pipelined processing of the current non-zero residual data block at the single-path pipeline, wherein the IS circuit is instructed to start IS processing of a next non-zero residual data block before the IT circuit finishes a first half of IT processing of the current non-zero residual data block.

17. A residual processing method comprising:
utilizing a multi-path pipeline to process a plurality of non-zero residual data blocks, wherein the multi-path pipeline comprises a plurality of parallel single-path pipelines, each comprising an inverse scan (IS) circuit, an inverse quantization (IQ) circuit and an inverse transform (IT) circuit arranged to process a non-zero residual data block in a pipeline manner, the non-zero residual data block is at least a portion of a transform unit, and the parallel single-path pipelines comprise a first single-path pipeline and a second single-path pipeline; and
controlling pipelined processing of the non-zero residual data blocks, wherein the second single-path pipeline is instructed to start pipelined processing of a next non-zero residual data block before the first single-path pipeline finishes a first half of IT processing of a current non-zero residual data block.

* * * * *